United States Patent
Chung et al.

(10) Patent No.: US 7,277,958 B2
(45) Date of Patent: Oct. 2, 2007

(54) RE-ASSEMBLY OF STREAMING FILES FROM SEPARATE CONNECTIONS

(75) Inventors: Randall M. Chung, Laguna Niguel, CA (US); Maged Bishay, Costa Mesa, CA (US); Michael Zelevinsky, San Diego, CA (US); Sivagnanam Parthasarathy, Carlsbad, CA (US)

(73) Assignee: Edgestream, Inc., Laguna Niguel, CA (US)

( * ) Notice: Subject to any disclaimer, the term of this patent is extended or adjusted under 35 U.S.C. 154(b) by 706 days.

(21) Appl. No.: 10/472,080

(22) PCT Filed: Mar. 12, 2002

(86) PCT No.: PCT/US02/07659

§ 371 (c)(1),
(2), (4) Date: Sep. 12, 2003

(87) PCT Pub. No.: WO02/073440

PCT Pub. Date: Sep. 19, 2002

(65) Prior Publication Data

US 2004/0103208 A1    May 27, 2004

Related U.S. Application Data

(60) Provisional application No. 60/275,407, filed on Mar. 12, 2001, provisional application No. 60/275,408, filed on Mar. 12, 2001.

(51) Int. Cl.
*G06F 15/16* (2006.01)

(52) U.S. Cl. .............. 709/231; 709/203; 709/214; 709/215; 709/217; 709/234; 709/235; 369/4; 707/10; 725/86; 725/143

(58) Field of Classification Search ............. 709/203, 709/215, 217, 231, 236, 246, 219, 214, 234, 709/235; 369/4; 707/10; 725/86, 143
See application file for complete search history.

(56) References Cited

U.S. PATENT DOCUMENTS

| | | | | |
|---|---|---|---|---|
| 5,802,301 A | * | 9/1998 | Dan et al. | 709/223 |
| 5,937,162 A | * | 8/1999 | Funk et al. | 709/206 |
| 5,956,716 A | * | 9/1999 | Kenner et al. | 707/10 |
| 5,996,015 A | * | 11/1999 | Day et al. | 709/226 |
| 6,009,457 A | * | 12/1999 | Moller | 709/203 |
| 6,021,433 A | * | 2/2000 | Payne et al. | 709/219 |
| 6,085,251 A | | 7/2000 | Fabozzi, II | |
| 6,170,060 B1 | | 1/2001 | Mott et al. | |
| 6,185,621 B1 | * | 2/2001 | Romine | 709/231 |

(Continued)

FOREIGN PATENT DOCUMENTS

WO    WO97/28620    8/1997
WO    WO98/33320    7/1998

*Primary Examiner*—Michael Won
(74) *Attorney, Agent, or Firm*—Crowell & Moring LLP (57) ABSTRACT

The invention is a technique and apparatus for re-assembling transmitted portions of files or sub-files (410, 420, 430, 440), into a viewable file (400). The transmitting device passes the information regarding the file dividing process to the receiver so that the sub-files can be assembled (1130) or stitched (1120) together properly. The media player (1140) in the receiver uses the attached instructions to assemble the sub-files into one whole piece for viewing.

36 Claims, 8 Drawing Sheets

U.S. PATENT DOCUMENTS

| | | | |
|---|---|---|---|
| 6,279,041 B1 * | 8/2001 | Baber et al. | 709/232 |
| 6,289,165 B1 * | 9/2001 | Abecassis | 386/46 |
| 6,349,329 B1 * | 2/2002 | Mackintosh et al. | 709/219 |
| 6,374,336 B1 * | 4/2002 | Peters et al. | 711/167 |
| 6,405,256 B1 * | 6/2002 | Lin et al. | 709/231 |
| 6,415,373 B1 * | 7/2002 | Peters et al. | 711/167 |
| 6,449,653 B2 * | 9/2002 | Klemets et al. | 709/231 |
| 6,480,537 B1 * | 11/2002 | Agrawal et al. | 375/240 |
| 6,480,938 B2 * | 11/2002 | Vondran, Jr. | 711/125 |
| 6,658,464 B2 * | 12/2003 | Reisman | 709/219 |
| 6,697,835 B1 * | 2/2004 | Hanson et al. | 709/201 |
| 6,701,355 B1 * | 3/2004 | Brandt et al. | 709/219 |
| 6,748,427 B2 * | 6/2004 | Drosset et al. | 709/219 |
| 6,760,916 B2 * | 7/2004 | Holtz et al. | 725/34 |
| 6,763,377 B1 * | 7/2004 | Belknap et al. | 709/223 |
| 6,801,938 B1 * | 10/2004 | Bookman et al. | 709/224 |
| 6,813,690 B1 * | 11/2004 | Lango et al. | 711/118 |
| 6,868,440 B1 * | 3/2005 | Gupta et al. | 709/219 |
| 6,868,452 B1 * | 3/2005 | Eager et al. | 709/231 |
| 6,956,573 B1 * | 10/2005 | Bergen et al. | 345/473 |
| 6,992,983 B1 * | 1/2006 | Chatterjee | 370/232 |
| 6,996,618 B2 * | 2/2006 | Apostolopoulos et al. | 709/227 |
| 7,020,888 B2 * | 3/2006 | Reynolds et al. | 709/219 |
| 7,024,485 B2 * | 4/2006 | Dunning et al. | 709/232 |
| 7,062,541 B1 * | 6/2006 | Cannon et al. | 709/219 |
| 7,103,677 B2 * | 9/2006 | Miller et al. | 709/238 |
| 7,155,531 B1 * | 12/2006 | Lango et al. | 709/231 |
| 2001/0033296 A1 * | 10/2001 | Fullerton et al. | 345/730 |
| 2002/0040479 A1 * | 4/2002 | Ehrman et al. | 725/95 |
| 2002/0067907 A1 * | 6/2002 | Ameres | 386/46 |
| 2002/0099798 A1 * | 7/2002 | Fedorovsky et al. | 709/219 |
| 2003/0101238 A1 * | 5/2003 | Davison | 709/219 |
| 2003/0177247 A1 * | 9/2003 | Dunning et al. | 709/228 |
| 2004/0103208 A1 * | 5/2004 | Chung et al. | 709/236 |

* cited by examiner

RE-ASSEMBLY OF STREAMING FILES FROM SEPARATE CONNECTIONS

CROSS-REFERENCE TO RELATED APPLICATION

This application is a national phase filing under 35 U.S.C. § 371 of the PCT Application No. PCT/US02/07659, filed Mar. 12, 2002 and titled "RE-ASSEMBLY OF STREAMING FILES FROM SEPARATE CONNECTIONS"; which claims priority from U.S. provisional patent application Nos. 60/275,407 and 60/275,408, filed Mar. 12, 2001 and titled "RE-ASSEMBLY OF STREAMING FILES FROM SEPARATE CONNECTIONS" and "SPLITTING AND REDUNDANT STORAGE ON MULTIPLE SERVERS," respectively, the contents of which are incorporated herein by reference in their entirety.

The present invention claims priority to U.S. provisional patent application Ser. No. 60/275,407, entitled "Re-Assembly of Streaming Files from Separate Connections," filed Mar. 12, 2001, and U.S. provisional patent application Ser. No. 60/275,408, entitled "Splitting and Redundant Storage on Multiple Servers", filed Mar. 12, 2001. The present application is also related to pending PCT Application No. PCT/US02/07724, entitled "Splitting and Redundant Storage on Multiple Servers," filed Mar. 12, 2002, which is assigned to the assignee of the present application, the subject matter of which is incorporated herein by reference.

BACKGROUND OF THE INVENTION

1. Field of the Invention

The present invention relates generally to data communication networks and more particularly to a method and apparatus for reassembling streaming files from separate connections.

2. Related Art

Replicating an entire file onto multiple file servers is a technique that can be used to speed up the delivery of data. Once the data has been replicated onto multiple servers, and the servers have been geographically dispersed, the data can be delivered to an end user from the closest available server. In addition, the data can be delivered from multiple servers simultaneously, where each server provides a portion of the total file. However, replicating the full file onto a large number of servers uses large amounts of expensive disk storage. For instance, a system consisting of a hundred servers with 100 gigabytes of storage each would have a total of 10,000 gigabytes of storage available if data were not replicated. If all files must be fully replicated onto each server, however, the system would only be able to store 100 gigabytes of unique files.

U.S. provisional patent application Ser. No. 60/275,408, entitled "Splitting and Redundant Storage on Multiple Servers", filed Mar. 12, 2001, describes a method and apparatus for dividing a file into multiple sub-files and storing the sub-files onto one or more servers. The servers may be distributed over different geographical locations. When an end user wants the file to be delivered in a streaming fashion, the sub-files can be transmitted in parallel from one or more servers, which increases the rate at which data can be delivered.

While splitting and distributed storage provides many advantages, it creates a daunting re-assembly task for the end-user's machine.

Accordingly, there is a need in the technology for a method and apparatus for overcoming the aforementioned problems.

BRIEF SUMMARY OF THE INVENTION

The invention is a technique and apparatus for re-assembling transmitted portions of files or sub-files, into a viewable file. The transmitting device passes the information regarding the file dividing process to the receiver so that the sub-files can be assembled or stitched back together properly. The media player in the receiver uses the attached instructions to assemble the sub-files into one whole piece for viewing.

DETAILED DESCRIPTION OF THE EMBODIMENTS

U.S. provisional patent application Ser. No. 60/275,408, entitled "Splitting and Redundant Storage on Multiple Servers", filed Mar. 12, 2001, the subject matter of which is incorporated herein by reference, describes the division of a single file into multiple sub-files and storage the sub-files onto one or more servers. Such a file may include text, data, graphics, video clips, JPEG elements or images, static photographs, web pages, audio clips, animation, any type of informational material or any combination thereof The servers may be distributed over different geographical locations. When an end user wants the file to be delivered in a streaming fashion, the sub-files can be transmitted in parallel from one or more servers, which increases the rate at which data can be delivered.

In one embodiment, each sub-file may be replicated onto more than one server so as to provide some redundancy. If one server is not available, or if the transmission link is slow or not available, the sub-file can be streamed to the end user from another server.

Replicating a file onto multiple file servers in accordance with the principles of the invention facilitates the transmission rate of the data. For instance, the data may be delivered to an end user from the closest and fastest server. In addition, the data may be delivered from multiple servers simultaneously, where each server provides a portion of the total file.

One aspect of the invention involves a technique and apparatus that may be used to re-assemble the sub-files into the viewable file. Such a technique may be implemented, for example, by the receiver or by the end-user's machine. The server passes the information regarding the splitting process to the receiver or end-user device so that the sub-files can be assembled or stitched back together properly. The media player in the receiver will use the attached instructions to stitch the sub-files into one whole piece for viewing.

A second aspect of the invention involves the determination of the optimum servers to be used for the transmission, if more than one server can actually provide the requested sub-file, and to change to the optimum servers at any time.

Definitions

As discussed herein, a "computer system" is a product including circuitry capable of processing data. The computer system may include, but is not limited to, general purpose computer systems (e.g., server, laptop, desktop, palmtop, personal electronic devices, etc.), personal computers (PCs), hard copy equipment (e.g., printer, plotter, fax machine, etc.), banking equipment (e.g., an automated teller machine), and the like. Content and/or media elements refers to application programs, driver programs, utility programs, file, payload, and combinations thereof, as well as graphics, informational material (articles, stock quotes, etc.) and the like, either singly or in any combination. A "communication link" refers to the medium or channel of communication. The communication link may include, but is not limited to, a telephone line, a modem connection, an Internet connection, an Integrated Services Digital Network ("ISDN") connection, an Asynchronous Transfer Mode (ATM) connection, a frame relay connection, an Ethernet connection, a coaxial connection, a fiber optic connection, satellite connections (e.g. Digital Satellite Services, etc.), wireless connections, radio frequency (RF) links, electromagnetic links, two way paging connections, etc., and combinations thereof.

System Overview

Figure 1:
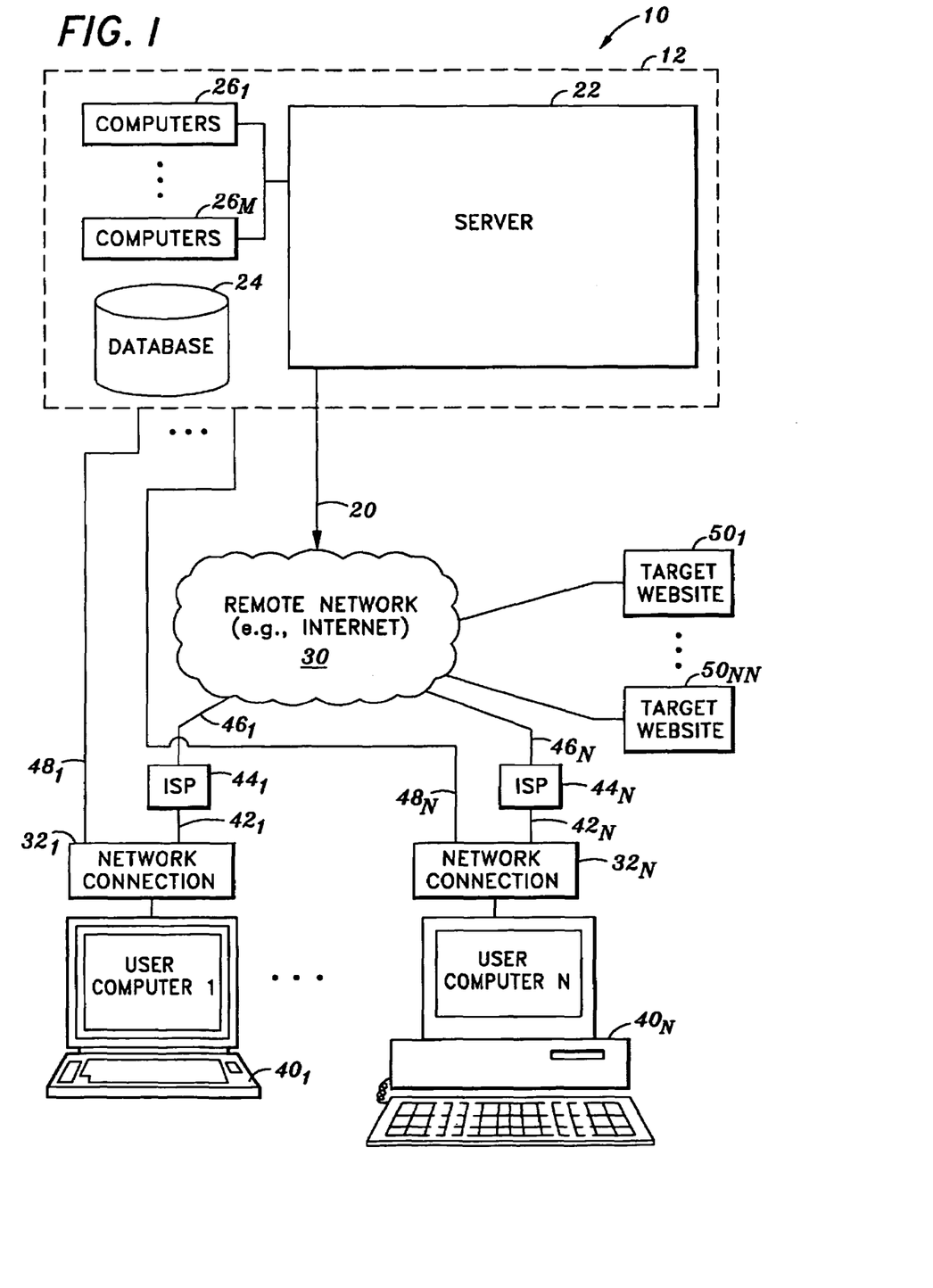
FIG. 1 is a system block diagram of one embodiment of a network system in which the system and method of the invention may be implemented.

A description of an exemplary system, which incorporates embodiments of the invention, is herein described. FIG. 1 shows a system block diagram of one embodiment of a network system 10 in which the apparatus and method of the invention is used. Referring to FIG. 1, the network system 10 comprises a service center 12 that is connected over one or more communication links 20 to a remote network 30 (e.g., a wide area network or the Internet) or a remote site (e.g., a satellite, which is not shown in FIG. 1) to one or more user computer systems $40_1$-$40_N$ ("40"). In one embodiment the service center 12 is a website. The service center 12 includes one or more servers 22 and one or more databases 24. In one embodiment, the server 22 includes software modules that may be downloaded for performing the processes of the invention, as described in detail in the following sections. In addition, there may be more than one service center 12, each having one or more servers.

The service center 12 may also include one or more computers $26_1$-$26_M$. If a plurality of computers are used, then the computers $26_1$-$26_M$ may be connected by a local area network (LAN) or any other similar connection technology. However, it is also possible for the service center 12 to have other configurations. For example, a smaller number of larger computers (i.e. a few mainframe, mini, etc. computers) with a number of internal programs or processes running on the larger computers capable of establishing communication links to the user computers.

The remote network 30 or remote site allows the service center 12 to provide peer-to-peer information and services to the user computers $40_1$-$40_N$, using software that is stored at the service center 12. In one embodiment, the user computers 40 may be any computer system or any other device that processes and/or presents audio and/or video information. The one or more databases 24 connected to the service center computer(s), e.g., computer $26_1$, are used to store data. Each user computer 40 is connected via network connection $32_1$-$32_N$ over a corresponding communication link $42_1$-$42_N$ such as a local carrier exchange to a respective ISP $44_1$-$44_N$, through which access to the remote network 30 is made.

By inputting the URL address of the target website with which the user desires to interact, the user may be connected to various target websites, such as websites $50_1$-$50_{NN}$. In an alternate embodiment, each user computer 40 may be connected via network connection $32_1$-$32_N$ over a corresponding communication link $48_1$-$48_N$ to the service center 12, which provides internet access and service to the user computer(s) 40. In a further embodiment, the display screen for viewing the content or media elements may be located on a television coupled to the network 30. In this case, navigation through the content or media elements may be provided through the use of control buttons on a remote control unit for controlling viewing of the television, or by other means known in the art.

One aspect of the present invention relates to retrieval and delivery of content and/or media elements. The software for providing such processes may be developed and/or stored on a computer 40, or may be developed using one of the computers $26_1$-$26_M$. Upon completion of the development process, the software may be stored in the computer 40 or in the database 24. Alternatively, the software may be stored on a machine-readable medium, in any of the computers 40 or computers $26_1$-$26_M$.

Figure 2:
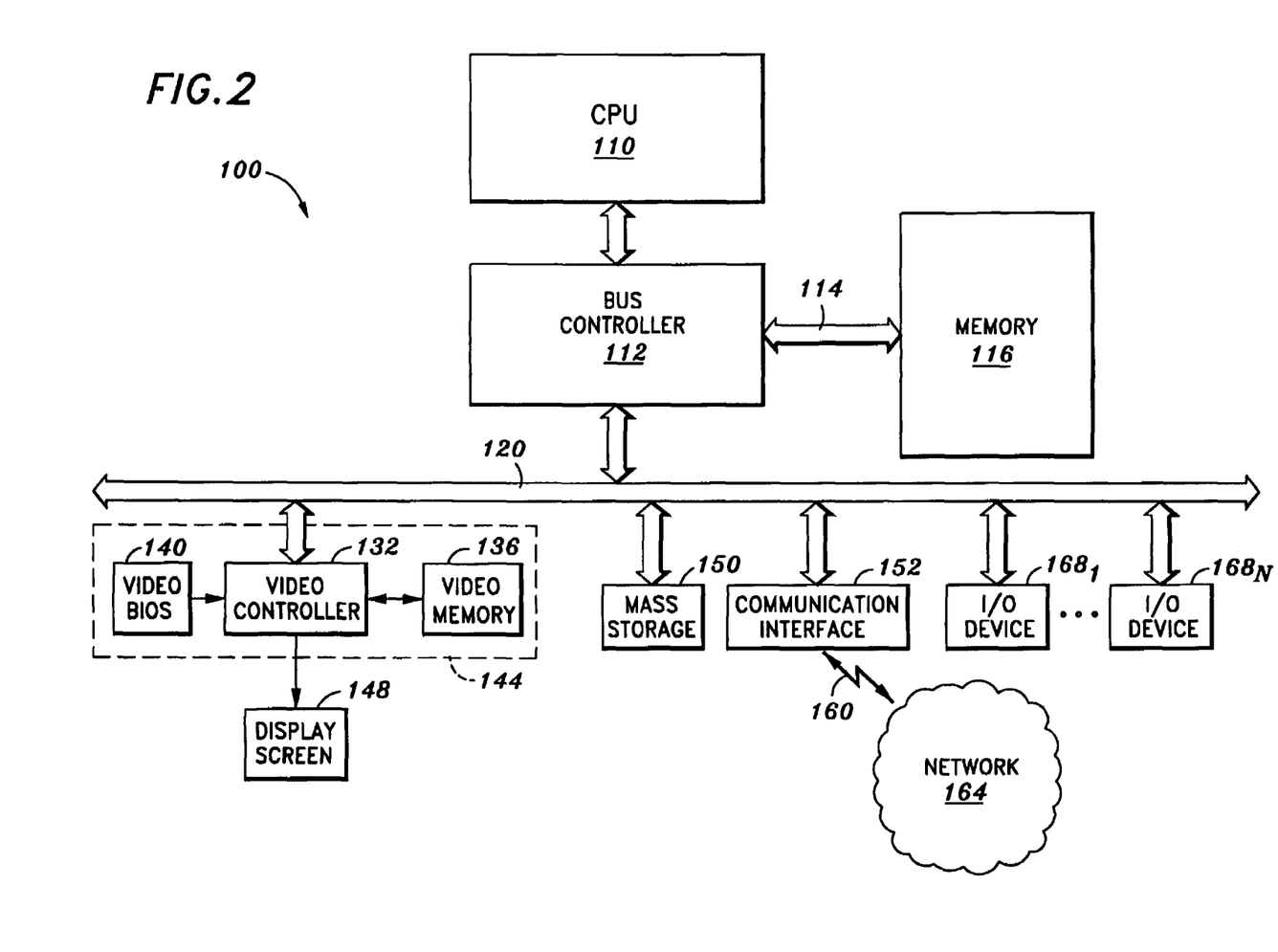
FIG. 2 is a system block diagram of one embodiment of a computer system which implements the embodiments of the invention.

Referring to FIG. 2, the computer system 100 (representing either of computer 26 or 40) comprises a processor or a central processing unit (CPU) 110. The illustrated CPU 110 includes an Arithmetic Logic Unit (ALU) for performing computations, a collection of registers for temporary storage of data and instructions, and a control unit for controlling operation for the system 100. In one embodiment, the CPU 110 includes any one of the x86, Pentium™, Pentium II™, and Pentium Pro™ microprocessors as marketed by Intel™ Corporation, the K-6 microprocessor as marketed by AMD™, or the 6x86MX microprocessor as marketed by Cyrix™ Corp. Further examples include the Alpha™ processor as marketed by Digital Equipment Corporation™, the 680X0 processor as marketed by Motorola™; or the Power PC™ processor as marketed by IBM™. In addition, any of a variety of other processors, including those from Sun Microsystems, MIPS, IBM, Motorola, NEC, Cyrix, AMD, Nexgen and others may be used for implementing CPU 110. The CPU 110 is not limited to microprocessor but may take on other forms such as microcontrollers, digital signal processors, reduced instruction set computers (RISC), application specific integrated circuits, and the like. Although shown with one CPU 110, computer system 100 may alternatively include multiple processing units.

The CPU 110 is coupled to a bus controller 112. The bus controller 112 may include a memory controller (not shown) integrated therein, though the memory controller may be external to the bus controller 112. The memory controller provides an interface for access by the CPU 110 or other devices to memory 116 via memory bus 114. In one embodiment, the system memory 116 includes synchronous dynamic random access memory (SDRAM). System memory 116 may optionally include any additional or alternative high speed memory device or memory circuitry. The bus controller 112 is coupled to a system bus 120 that may be a peripheral component interconnect (PCI) bus, Industry Standard Architecture (ISA) bus, etc. Coupled to the system bus 120 are a graphics controller, a graphics engine or a video controller 132, a mass storage device 150, a communication interface device 152, and one or more input/output (I/O) devices $168_1$-$168_N$. The video controller 132 is coupled to a video memory 136 (e.g., 8 Megabytes) and video BIOS 140, all of which may be integrated onto a single card or device, as designated by numeral 144. The video memory 136 is used to contain display data for displaying information on the display screen 148, and the video BIOS 140 includes code and video services for controlling the video controller 132. In another embodiment, the video controller 132 is coupled to the CPU 110 through an Advanced Graphics Port (AGP) bus.

The mass storage device 150 includes (but is not limited to) a hard disc, floppy disc, CD-ROM, DVD-ROM, tape, high density floppy, high capacity removable media, low capacity removable media, solid state memory device, etc., and combinations thereof The mass storage device 150 may include any other mass storage medium. The communication interface device 156 includes a network card, a modem interface, etc. for accessing network 164 via communications link 160. The I/O devices $168_1$-$168_N$ include a keyboard, mouse, audio/sound card, printer, and the like. The I/O devices $168_1$-$168_N$ may be disk drive, such as a compact disc (CD) drive, a hard disc drive, a tape drive, a zip drive, a jazz drive, a digital versatile disc (DVD) drive, a magneto-optical disk drive, a high density floppy drive, a high capacity removable media drive, a low capacity media device, and/or any combination thereof.

The information, content and/or application software may be stored in the database 24, on the computers 40, or on a machine-readable medium. The information, content and/or application software may also be made available to users such as those located at user computer 1-N, i.e., computers $40_1$-$40_N$, through service center 12 or by means of the machine-readable medium.

As discussed earlier, one aspect of the invention relates to a system and method for providing media over a network in a non-sequential fashion. In one embodiment, a request may be made by a user for content or media elements. The system and process of the invention may retrieve the desired content/media element from either database 24 or one of target websites $50_1$-$50_{NN}$. The retrieved content/media element is then processed (e.g., decompressed, formatted, etc.). Users may then view the processed content/media element on a display device, such as a user computer 40. In another embodiment, the desired content/media is provided to the user in a non-sequential fashion.

In accordance with the practices of persons skilled in the art of computer programming, the invention is described below with reference to symbolic representations of operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data its at memory locations such as in system memory, as well as other processing of signals. The memory locations where data its are maintained are physical locations that have particular electrical, magnetic, optical, or organic properties corresponding to the data bits. Thus, the term "server" is understood to include any electronic device that contains a processor, such as a central processing unit.

When implemented in software, the elements of the invention are essentially the code segments to perform the necessary tasks. The program or code segments can be stored in a processor readable medium The "processor readable medium" or "machine-readable medium" may include any medium that can store or transfer information. Examples of the processor readable medium include an electronic circuit, a semiconductor memory device, a read only memory (ROM), a flash memory, an erasable ROM (EROM), a floppy diskette, a compact disk ROM (CD-ROM), an optical disk, a hard disk, a fiber optic medium, etc. The codes segments may be downloaded via computer networks such as the Internet, Intranet, etc.

Setup Process

Figure 3:
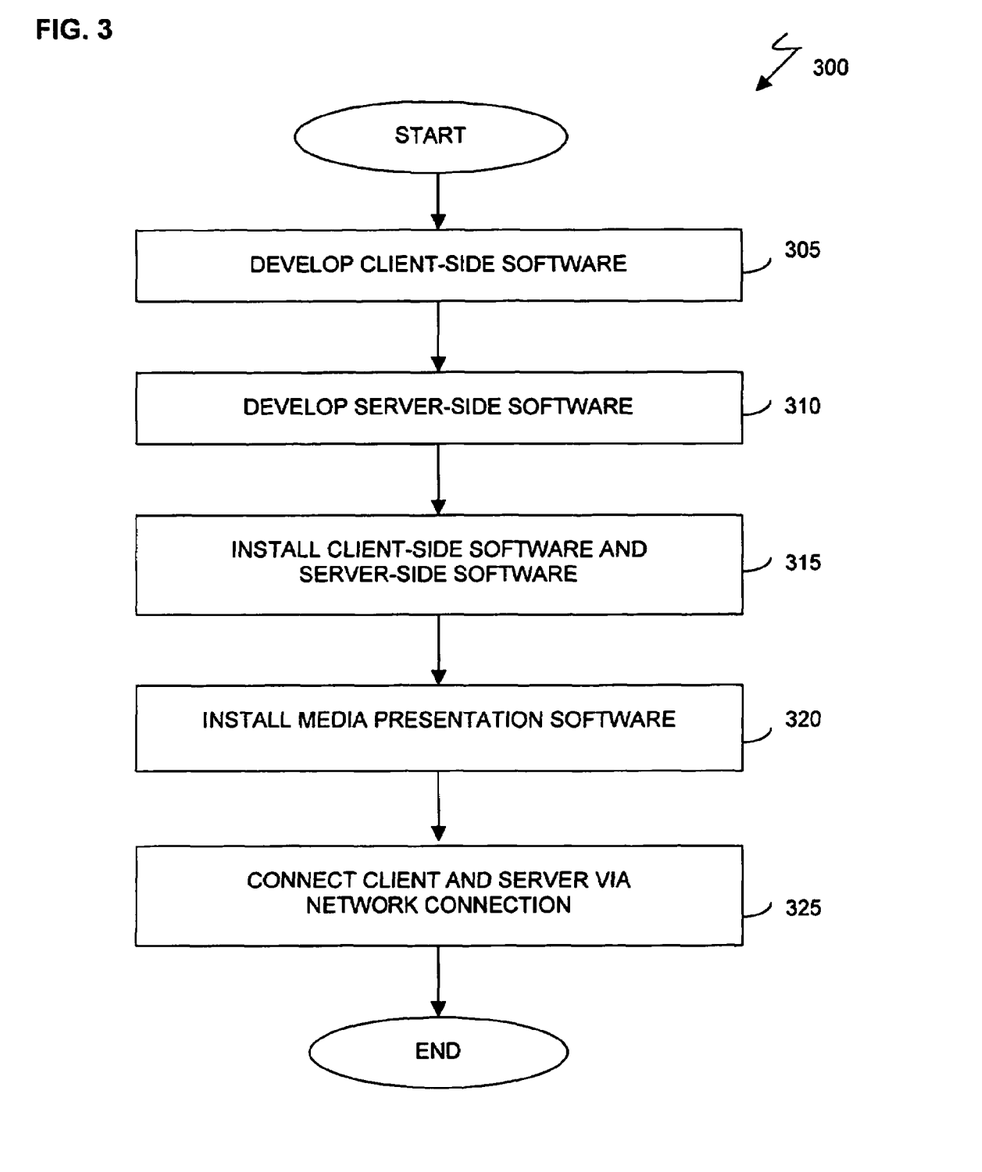
FIG. 3 is a flow chart illustrating one embodiment of the setup process provided in accordance with the principles of the invention.

Referring now to FIG. 3, in which a setup process is depicted. Setup process 300 begins with the development of the client-side software at block 305. As will be discussed in more detail below, the client-side software will enable a user to communicate with client-side software by issuing read requests to one or more servers, according to one embodiment. In another embodiment, the client-side software also comprises stitching software which may be used to reassemble a requested file, or portion thereof, which has been previously split.

One example of a method for reassembling streaming files is provided in related POT Application No. PCT/US02/07659, entitled "Re-assembly of Streaming Files from Separate Connections" (hereinafter the "PCT/US02/07659 patent application"), which describes the reassembly of the sub-files into viewable file upon receipt by a client system.

In one embodiment, the server passes the information regarding the splitting process to the client system to facilitate the sub-file reassembly process.

Server-side software is developed at block 310. As will be discussed in more detail below, the server-side software will be able to process random read requests, according to one embodiment. The server-side software of block 310 may also enable a server to perform offset computations, thereby enabling the server to stream content to a client system beginning at the requested location. The server-side software may also comprise software to split a single file into multiple sub-files, which may then be distributed and stored on one or more servers.

One example of a method for splitting files into sub-files is provided in related POT Application No. PCT/US02/07724, entitled "Splitting and Redundant Storage on Multiple Servers" (hereinafter the "PCT/US02/07724 patent application"), which describes the division of a single file into multiple sub-files which are then stored on one or more servers.

Such a file may include text, data, graphics, video clips, JPEG elements or images, static photographs, web pages, audio clips, animation, any type of informational material or any combination thereof. The servers may be distributed over different geographical locations. In one embodiment, the sub-files can be transmitted in parallel from one or more servers in response to a user request, thereby increasing the rate at which data can be delivered.

While in the embodiment of FIG. 3 the development of the server-side software takes place at block 310, it should be appreciated that the server-side software may be developed before the client-side software of block 305. It should further be appreciated that the development process of block 305 or block 310 may take place on any one of user computers 40, computers $26_1$-$26_M$, server 22, or any other system capable of being used for software development. It is also possible to install both client-side and server-side software on the same client computer to implement a peer-to-peer system.

Continuing to refer to FIG. 3, the software of block 305 and 310 are installed at block 315. It should be appreciated that the client-side software of block 305 may be installed on one or more user computers 40, while the server-side software of block 310 may be installed on server 22. In another embodiment the server-side software is installed on a plurality of servers connected either to the network 30 or to the client systems directly over a communications link.

At block 320, media presentation software is installed on one or more client system, such as one or more user computers 40. Media presentation software may include any of Windows Media Player, Real Player, QuickTime Player, or any other media players capable of receiving streaming content. It should also be appreciated that the media presentations software installation of block 320 may occur before the installation activities of blocks 315, and even before the development activities of blocks 305 and 310. Thereafter, the client system(s) on which the client-side software was loaded may be connected to the server(s) running the server-side software. In one embodiment, the client system communicates with the server(s) by connecting to the World Wide Web, while in another embodiment the client system(s) and the server(s) communicate over a LAN connection. However, it should be appreciated that the client system(s) may interact with the server(s) over any known communication link.

Figure 4:
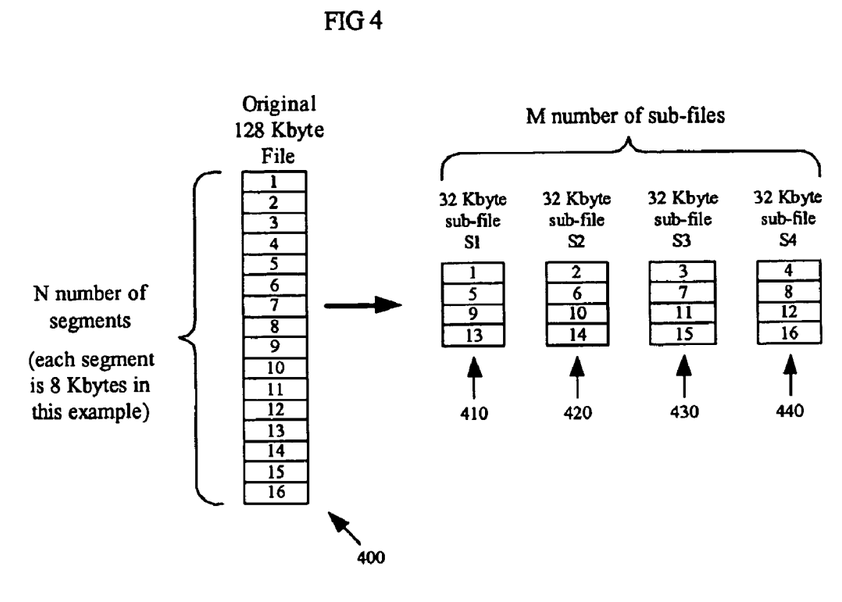
FIG. 4 illustrates one embodiment of a process for splitting and distributing a file, in accordance with the principles of the invention.

FIG. 4 illustrates one embodiment of a process for dividing a file, in accordance with the principles of the invention. In this embodiment, a 128 kilobyte file is divided and distributed. The size of the file is merely illustrative, and it is understood that the invention may be implemented using a file of a greater or smaller size. Such a file may include text, data, graphics, video clips, JPEG elements or images, static photographs, web pages, audio clips, animation, any type of informational material or any combination thereof.

Prior to transmission, the original file is configured for transmission. For example, the original file may be divided into N segments or chunks, where N is a positive integer. The N segments are assembled into M sub-files, where M is a positive integer. Each of the sub-files has a file name and other file attributes, and is treated by the operating system's file system as just another file. In the present example, the original 128 kilobyte file is split up into sixteen 8 KB segments (i.e., N=16 in the example). The sixteen segments are assembled into four sub-files (i.e., M=4 in the example), where the first 8 KB chunk of the original file goes into the first sub-file S1, the second chunk of the original file goes into the second sub-file S2, and so on. The fifth chunk of the original file would go into the first sub-file S1, after the first chunk of the original file. Thus, in one embodiment, the segments may be assigned to sub-files on a modulo 4 arrangement. Although in the present embodiment, the file is divided into 8 kilobyte segments, it is understood that the size of the segments and the number of sub-files is arbitrary. The invention may be implemented using a larger or smaller size chunk and a larger or smaller number of sub-files. In addition, each of the sub-files may be of different sizes. However, in one embodiment, the segments may be distributed in modulo order and the sub-files may be of substantially equal size.

Figure 5:
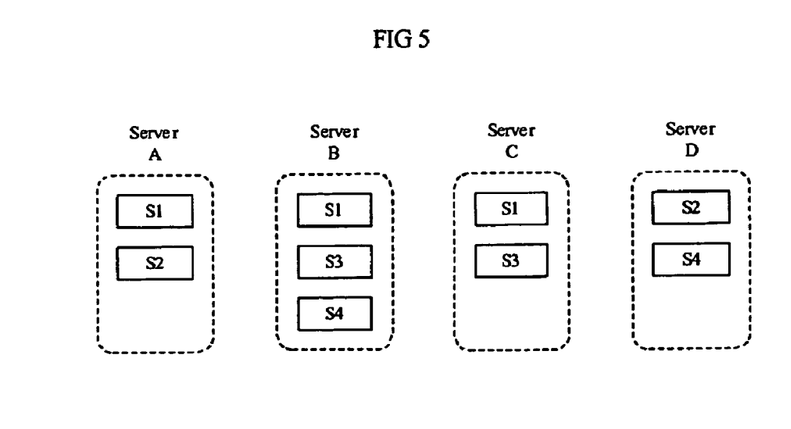
FIG. 5 illustrates one embodiment of a process for replicating storage of sub files, provided in accordance with the principles of the invention.

The four sub-files S1 through S4 may be distributed to multiple servers. As shown in the example of FIG. 5, the first sub-file S1 may be distributed to three servers, servers A, B, and C. The second sub-file S2 may be distributed to servers D and A. The third sub-file S3 may be distributed to servers B and C. The fourth sub-file S4 may be distributed to servers D and B. It is understood that the sub-files may be distributed to a fewer or greater number of servers. Each sub file may be transmitted over a separate communication link, such as a TCP/IP connection to a receiver. In one embodiment, the Hyper Text Transfer Protocol (HTTP) may be used for each connection.

In one embodiment, the sub-files can be replicated so that the most frequently accessed files and sub-files are replicated onto more servers, while the less frequently accessed files and sub-files are replicated onto fewer servers. Thus, the sub files may be replicated onto multiple servers based on anticipated or actual demand. This saves disk space, since infrequently accessed files would take up less total disk space. Disk input/output bandwidth on each server would also be saved. For example, each server would read a 32 kilobyte sub-file and transmit the sub-file to the end user. If the files were not split up beforehand, each server would read the entire 128 kilobyte file, while transmitting only 32 kilobytes.

Figure 6:
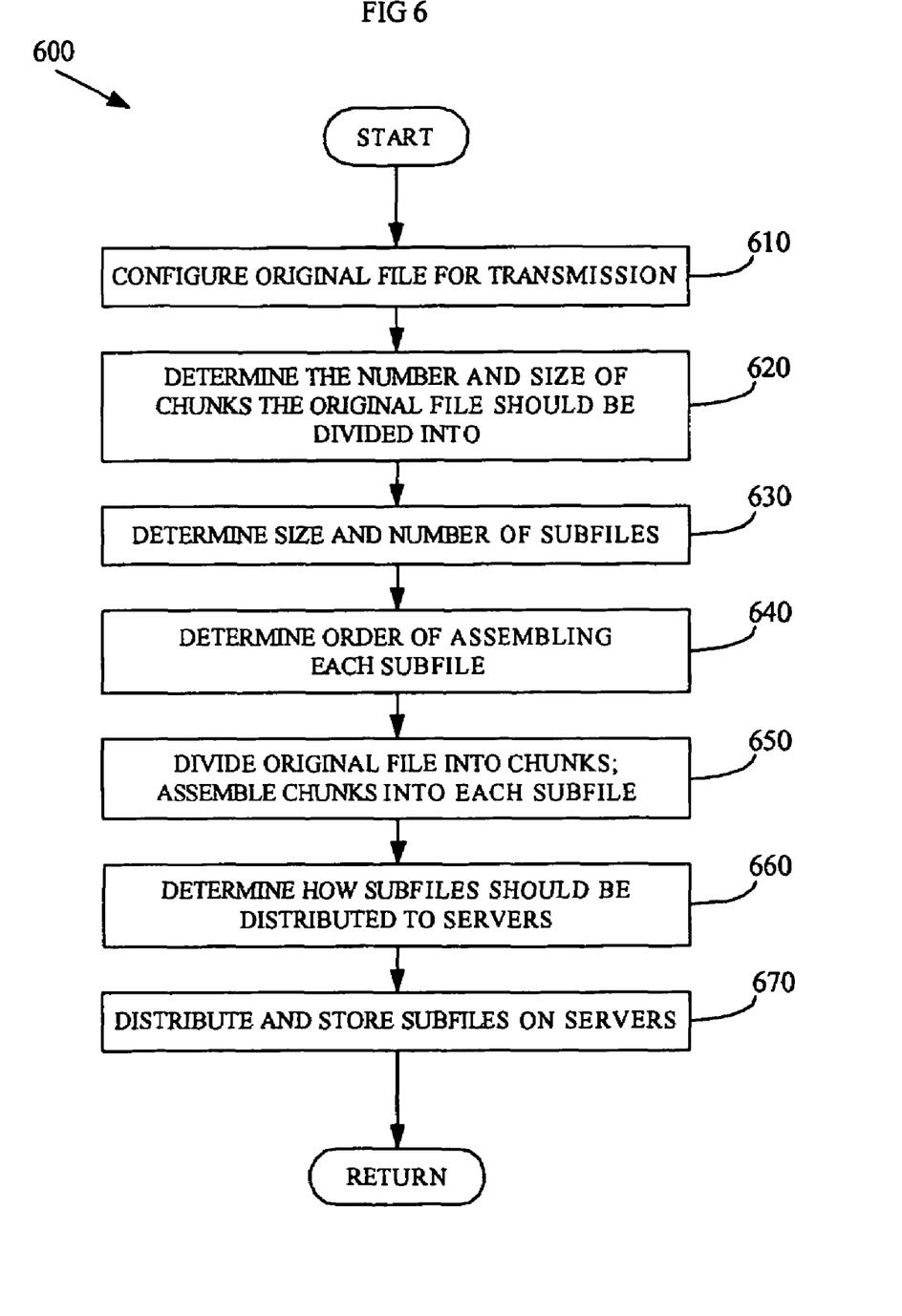
FIG. 6 is a flow chart illustrating one embodiment of a process flow for configuring a file for storage, provided in accordance with the principles of the invention.

FIG. 6 is a flow chart illustrating one embodiment of a process flow for configuring a file for storage. Proceeding from a START state, the process 600 proceeds to configure an original file, such as file 400 of FIG. 4, for transmission. The process 600 begins by determining the number and size of segments that the original file 400 should be divided into, as shown in process block 620. The process 600 then determines the size and number of sub-files that the segments should be assembled into (process block 630). Next, the process 600 determines the order of assembling the segments into each sub-file (process block 640).

The process 600 is then ready to divide the original file, and proceeds to configure the original file by dividing it into segments, and thereafter assembling the segments into the sub-files, as discussed above (process block 650). The process 600 then determines how the sub-files should be distributed to various servers for storage (process block 660). When this has been determined, the process 600 distributes and stores the sub-files onto the servers (process block 670). The process 600 then terminates or returns to the main process.

Figure 7:
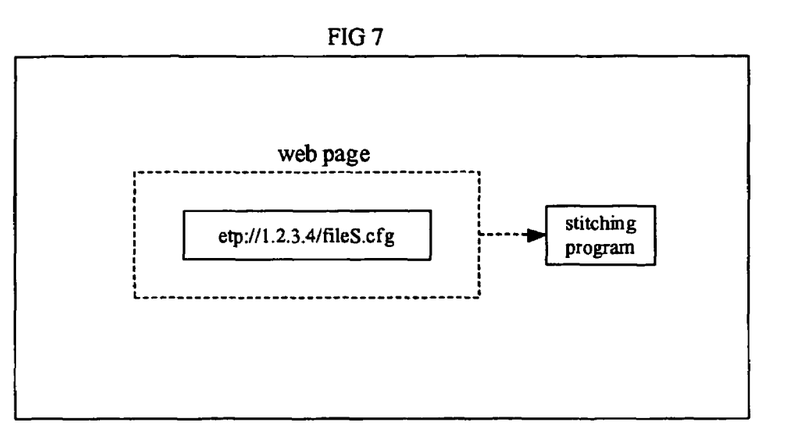
FIG. 7 illustrates one embodiment of the beginning portion of a playback process of a re-assembled media file.

FIG. 7 illustrates one embodiment of the beginning portion of a playback process of a re-assembled media file. For illustrative purposes, the playback process is described with reference to an end user's personal computer (PC). It is understood that the playback process and other processes described herein may be implemented on the receiver device in other electronic systems. As shown in FIG. 7, the end user would view a web page that contains a link to a video clip. The link may be of the form "etp://1.2.3.4/fileS.cfg". When the end user clicks on the web page link, the web browser receives the file named file1.cfg from the server with the Internet address of 1.2.3.4, which will start the stitching program associated with the "etp:" protocol, and which will then transfer the contents of fileS.cfg to the stitching program.

Prior to transmission, the original file is configured for transmission. For example, the original file may be divided into N segments, where N is a positive integer. The N segments are assembled into M sub-files, where M is a positive integer. In one embodiment, the first chunk of the original file goes into the first sub-file S1, the second chunk of the original file goes into the second sub-file S2, and so on. The fifth chunk of the original file would go into the first sub-file S1, after the first chunk of the original file.

The contents of fileS.cfg may contain information such as the size of the segments, the number N of the segments, the number M of sub-files, the file size of the original file, and a list of Universal Resource Locator (URL) names of the sub-files. It is understood by one of skill in the art that it is possible to provide the configuration information through other techniques. For instance, it is possible to provide this information on a static or dynamically generated HTML web page. It is also possible to secure the configuration information by encrypting it.

Figure 8:
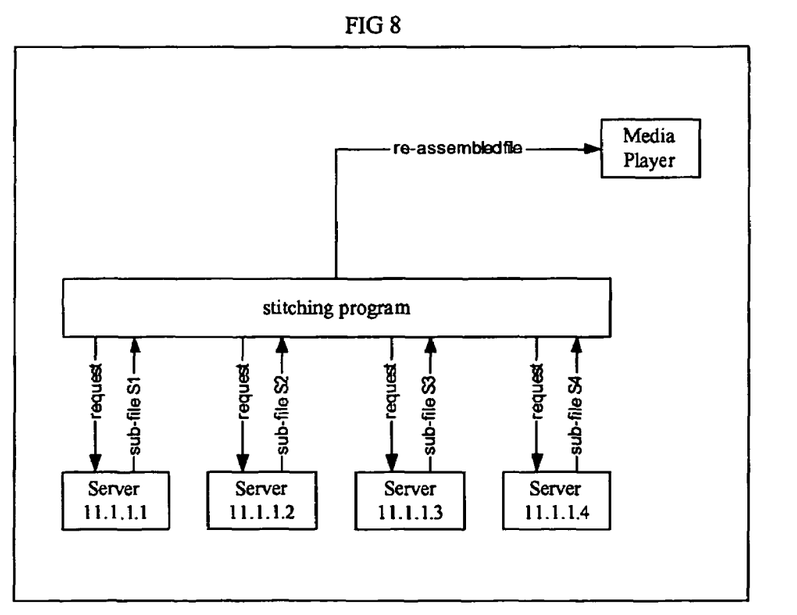
FIG. 8 illustrates one embodiment of a simultaneous transfer process, provided in accordance with the principles of the invention.

The stitching program will use the configuration information to simultaneously request sub-file S1 from server 11.1.1.1, sub-file S2 from server 11.1.1.2, sub-file S3 from server 11.1.1.3, and sub-file S4 from server 11.1.1.4, as illustrated in FIG. 8. Although this example shows one sub-file being transmitted from each server, it is possible for multiple sub-files to originate from a single server, with each sub-file transmitted on a separate TCP/IP connection.

Figure 9:
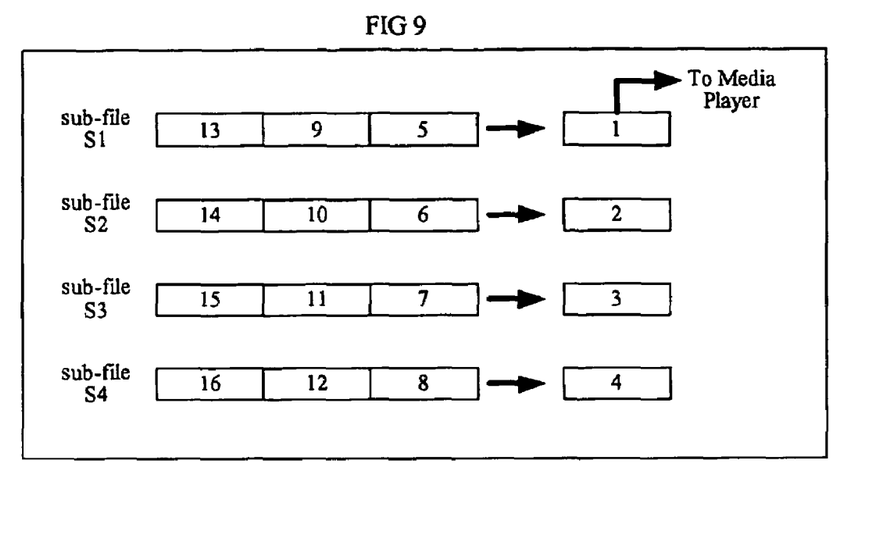
FIG. 9 illustrates one embodiment of a transfer flow from a server, provided in accordance with the principles of the invention.

As shown in FIG. 9, sub-file S1 contains segments 1, 5, 9, and 13 of the original file. The chunk 1 data will be transmitted first, then chunk 5, and so on. Sub-file S2 contains segments 2, 6, 10, and 14 of the original file. The chunk 2 data will be transmitted first, then chunk 6, and so on. The segments of sub-file S1 will be transmitted separately and in parallel with the segments of sub-file S2, because each sub-file would be transmitted over separate TCP/IP connections or via separate communication links.

In one embodiment, the sub-files will be transmitted at different rates from the different servers. In alternate embodiments, the sub-files may be transmitted at the same rates from one or more servers. Transmission errors, or lost packets for instance, will cause the TCP/IP protocol to retransmit a data packet until the packet is received correctly. This retransmission, among other things, will affect the transmission rate. Some paths may have more errors and lost packets than other paths. Some paths may also have more router hops and delays than other paths. This means that the reassembly of the segments into the original order of segments cannot be performed until the next required chunk has been fully and correctly received. For instance, once chunk 1 has been fully received and sent on to the media player, chunk 2 cannot be sent to the media player until it has been fully and correctly received, even if segments 3, 4, and 5 have been already received.

Once the media player has started, it must have data delivered at the proper rate, or the sound or video quality will suffer. To help guarantee that the data will be received in time, the stitching program measures the speed of each connection as data is received. If data is received at too slow of a rate on a connection, the slow connection can be terminated, and a new connection can be started to the fastest server that contains a copy of the required sub-file.

Figure 10:
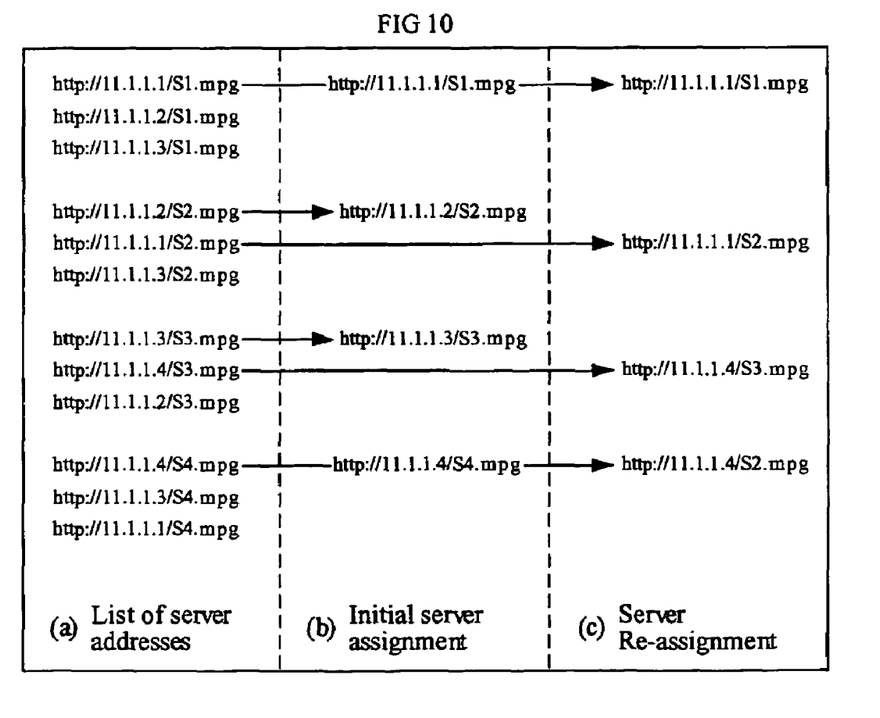
FIG. 10A illustrates one embodiment of a list of server addresses, provided in accordance with the principles of the invention.
FIG. 10B illustrates one embodiment of an initial server assignment, provided in accordance with the principles of the invention.
FIG. 10C illustrates one embodiment of server re-assignment, provided in accordance with the principles of the invention.

This server switching process may be implemented by providing multiple URLs in the configuration file. Each URL refers to a server that can provide the needed sub-file. An example of a URL list is shown in FIG. 10A. The list has three server choices for each sub-file. The initial server assignment for each sub-file is made from the first choice of possible assignments. The media transfers start out using these initial server assignments, as shown in FIG. 10B. Sub-file S1.mpg is transferred from the server with the IP address of 11.1.1.1 (an exemplary IP address) using the HTTP protocol, sub-file S2.mpg is transferred from the server with the IP address of 11.1.1.2, sub-file S3.mpg is transferred from the server with the IP address of 11.1.1.3, and sub-file S4.mpg is transferred from the server with the IP address of 11.1.1.4.

At periodic intervals, the transfer rate from each server is measured and compared to a threshold for switching. If a sub-file's transfer rate is below the threshold, a new connection is established with the fastest server available for the sub-file. File offset information may be passed to the fast server about how much data had been received by the slow server, so that the fast server would not have to transmit duplicate information already received from the slow server. The connection to the slow server could be terminated once the new connection to the fast server has been established.

Among other options, the transfer rate switching threshold may be fixed, may be passed as a parameter in the configuration file, or may be made a function of other variables, such as the projected data buffer empty time. For instance, the transfer rate switching threshold may be increased if a large amount of data is buffered before it is needed, or the threshold may be decreased if only a small amount of data is buffered and the media player may soon be running out of input data.

FIG. 10C illustrates one embodiment of how the server connections could be re-assigned, assuming that the connection from server 11.1.1.2 for sub-file S2.mpg and the connection from server 11.1.1.3 for sub-file S3.mpg were slow and below the transfer rate switching threshold. For sub-file S2.mpg, the server 11.1.1.1 is chosen for the new connection because that server is already providing data for sub-file A1.mpg at a rate above the transfer rate switching threshold. For sub-file S3.mpg, the server 11.1.1.4 is chosen for the new connection because that server is already providing data for sub-file S1.mpg at a rate above the transfer rate switching threshold.

This procedure allows data to be transferred from multiple servers simultaneously for higher transfer rates. The data would be recombined, or stitched back together, for the media player. Each path's data transfer rate may be periodically measured and the slow paths or servers may be switched out in favor of faster paths or servers. This switching may occur at the very start of the transfer, so that it would not be necessary to keep a continuously updated map of the Internet's congestion. The switching may also occur periodically during the media playback, so that unexpected slowdowns in data transfer from one or more servers or paths could be countered. Only a small amount of buffering will be needed to make the switching process transparent to the end user.

Figure 11:
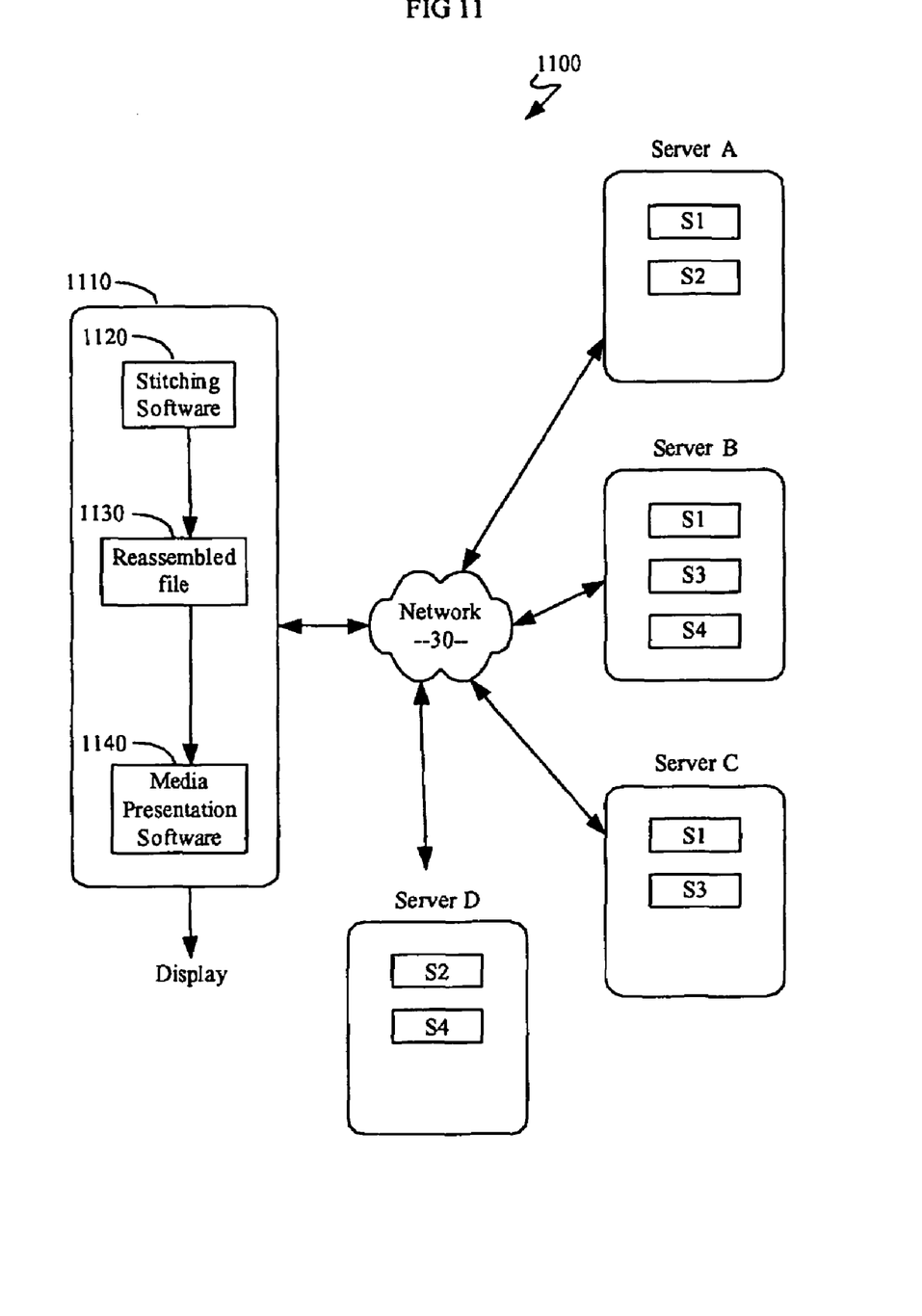
FIG. 11 is a system block diagram of one example of a networked system that implements one embodiment of the process of the invention.

FIG. 11 is a block diagram illustrating one example of a networked system 1100 that implements one embodiment of the invention. Client system 1100 running client-side software, is connected to one or more servers over network 30. Moreover, in this embodiment Servers A, B, C and D are running server-side software, and are connected to network 30. However, it should be appreciated that client system 1110 and Servers A-D may be connected using any known communication link.

In one embodiment, the client-side software of client system 1110 includes stitching software 1120, which may be used to create reassembled file 1130. Thereafter, reassembled file 1130 may be provided to media presentation software 1140 for display. In one embodiment, stitching software 1120 is used to reassemble file segments which have been transferred from one or more of the Servers A-D.

While any known means of reassembling file segments may be used, the method described in the PCT/US02/07659 patent application may be used, according to one embodiment.

Continuing to refer to FIG. 11, sub-files S1 and S2 from FIG. 4 have been loaded onto Server A. Similarly, sub-files S1, S3 and S4 have been loaded onto Server B, sub-files S1 and S3 have been loaded onto Server C and sub-files S2 and S4 have been loaded onto Server D. Thus, in this embodiment the original file 400 (see FIG. 4) has been split into four sub-files S1 410, S2 420, S3 430 and S4 440, with each of the four sub-files S1-S4 being available from more than one server. As described earlier, this arrangement improves the speed at which a user will be able to download a given file.

The sub-files S1, S2, S3 and S4 may be accessed via network 30 upon demand. Upon retrieval, the files may be recombined using stitching software 1120 into reassembled file 1130. Thereafter, reassembled file 1130 may be provided to media presentation software 1140 for display.

While the preceding description has been directed to particular embodiments, it is understood that those skilled in the art may conceive modifications and/or variations to the specific embodiments described herein. Any such modifications or variations which fall within the purview of this description are intended to be included therein as well. It is understood that the description herein is intended to be illustrative only and is not intended to limit the scope of the invention.

What is claimed is:

1. A method for receiving streaming content over a network, where said streaming content has been split into a plurality of segments and organized into a plurality of sub-files, the method comprising:
   receiving sub-file data at a client system over the network, said sub-file data to identify a location of each of said plurality of sub-files;
   requesting, using said sub-file data, a first sub-file and a second sub-file of said plurality of sub-files;
   receiving at the client system over the network, in response to said request, said first sub-file and said second sub-file from one or more servers;
   combining at the client system said first sub-file and second sub-file into a reassembled file;
   presenting at least a portion of the reassembled file on the client system during said combining; and
   terminating an existing server connection in favor of a new server connection based on a rate of said receiving the first sub-file and second sub-file.

2. The method of claim 1 wherein said receiving sub-file data over the network comprises receiving sub-file data over the network, where said sub-file data is to identify the location of each of said plurality of sub-files, and further to identify which of said plurality of segments are in each of said plurality of sub-files.

3. The method of claim 2, wherein said sub-file data is to further identify an order in which said plurality of segments are organized into said plurality of sub-files.

4. The method of claim 3, wherein said order is characterized by organizing a first segment into the first sub-file, a second segment into the second sub-file and a third segment into the first sub-file.

5. The method of claim 3, wherein said plurality of sub-files are further organized into a plurality of sub-file groups, and said order is characterized by organizing a first sequence of segments across a first sub-file group, followed by organizing a second sequence of segments across said first sub-file group.

6. The method of claim 1, wherein said receiving sub-file data is in response to a user request for said content.

7. The method of claim 1, wherein said receiving sub-file data over the network comprises receiving sub-file data over the network, said sub-file data to include a Universal Resource Locator (URL) for each of said plurality of sub-files.

8. The method of claim 1, wherein said requesting, using said sub-file data, the first sub-file and the second sub-file comprises requesting, using said sub-file data, the first sub-file from a first server and the second sub-file from a second server.

9. The method of claim 1, wherein receiving, in response to said request, said first sub-file and said second sub-file comprises receiving over the network, in response to said request, said first sub-file from a network server, and receiving over the network, in response to said request, said second sub-file from said network server.

10. The method of claim 1, wherein receiving, in response to said request, said first sub-file and said second sub-file comprises receiving over the network, in response to said request, said first sub-file from a first server and said second sub-file from a second server.

11. The method of claim 1, wherein combining said first sub-file and second sub-file comprises combining said first sub-file and second sub-file into a reassembled file using the sub-file data.

12. The method of claim 11, wherein presenting said reassembled file on the client system comprises presenting the reassembled file using a media player executing on the client system.

13. A client system for receiving streaming contents over a network, where said streaming content has been split into a plurality of segments and organized into a plurality of sub-files, the client system comprising:
   a processor;
   a communications port, coupled to the processor, said communications port to be used to connect said apparatus to a network; and
   a memory, coupled to the processor, said memory to include instruction sequences to cause said processor to,
   receive sub-file data over the network, said sub-file data to identify a location each of said plurality of sub-files,
   request, using said sub-file data, a first sub-file and a second sub-file of said plurality of sub-files, receive over the network, in response to said request, said first sub-file and said second sub-file from one or more servers, combine at the client side device said first sub-file and second sub-file into a reassembled file, present at least a portion of the reassembled file on the client system while combining the first sub-file and second sub-file; and terminate an existing server connection in favor of a new server connection based on a rate of said receiving the first sub-file and second sub-file.

14. The client system of claim 13, wherein said sub-file data further identifies which of said plurality of segments are in each of said plurality of sub-files.

15. The client system of claim 14, wherein said sub-file data is to further identify an order in which said plurality of segments are organized into said plurality of sub-files.

16. The client system of claim 15, wherein said order is characterized by organizing first segment into first sub-files, a second segment into the second sub-file and a third segment into the first sub-file.

17. The client system of claim 15, wherein said plurality of sub-files are further organized into a plurality of sub-file groups, and said order is characterized by organizing a first sequence of segments across a first sub-file group, followed by organizing a second sequence of segments across said first sub-file group.

18. The client system of claim 13, wherein said sub-file data is to be received in response to a user request for said content.

19. The client system of claim 13, wherein said sub-file data is to include a Universal Resource Locator (URL) for each of said plurality of sub-files.

20. The client system of claim 13, wherein said memory further includes instruction sequences to cause said processor to request, using said sub-file data, the first sub-file from a first server and the second sub-file from a second server.

21. The client system of claim 13, wherein said memory further includes instruction sequences to cause said processor to receive over the network, in response to said request, said first sub-file from a network server, and to receive over the network, in response to said request, said second sub-file from said network server.

22. The client system of claim 13, wherein said memory further includes instruction sequences to cause said processor to receive, in response to said request, said first sub-file from a first server and said second sub-file from a second server.

23. The client system of claim 13, wherein said memory further includes instruction sequences to cause said processor to combine said first sub-file and second sub-file into a reassembled file using the sub-file data.

24. The client system of claim 23, wherein said memory further includes instruction sequences to cause said processor to present said reassembled file using a media player.

25. A computer program product, comprising:
a computer usable storage medium having computer readable program code embodied therein to provide content over a network where the content has been split into a plurality of segments and organized into a plurality of sub-files, the computer readable program code in said computer readable program product comprising:

first computer readable program code to receive at a client system sub-file data over the network, said sub-file data to identify a location of each of said plurality of sub-files;

second computer readable program code to issue a request, using said sub-file data for a first sub-file and a second sub-file of said plurality of sub-files;

third computer readable program code to receive at the client system over the network, in response to said request, said first sub-file and said second sub-file from one or more servers;

fourth computer readable program code to combine at the client system said first sub-file and second sub-file into a reassembled file;

fifth computer readable program code to present at least a portion of the reassembled file at the same time as combining the first sub-file and second sub-file; and sixth computer readable program code to terminate an existing server connection in favor of a new server connection based on a rate of said receiving the first sub-file and second sub-file.

26. The computer program product of claim 25, wherein the first computer readable program code comprises first computer readable program code to receive sub-file data over the network, where said sub-file data is to identify the location of each of said plurality of sub-files, and further to identify which of said plurality of segments are in each of said plurality of sub-files.

27. The computer program product of claim 26, wherein the first computer readable program code comprises first computer readable program code to receive sub-file data over the network, where said sub-file data is to identify the location of each of said plurality of sub-files, identify which of said plurality of segments are in each of said plurality of sub-files, and to identify an order in which said plurality of segments are organized into said plurality of sub-files.

28. The apparatus of claim 27, wherein said order is characterized by organizing a first segment into the first sub-file, a second segment into the second sub-file and a third segment into the first sub-file.

29. The apparatus of claim 27, wherein said plurality of sub-files are further organized into a plurality of sub-file groups, and said order is characterized by organizing a first sequence of segments across a first sub-file group, followed by organizing a second sequence of segments across said first sub-file group.

30. The computer program product of claim 25, wherein the first computer readable program code comprises first computer readable program code to receive sub-file data over the network in response to a user request for said content, said sub-file data to identify a location of each of said plurality of sub-files.

31. The computer program product of claim 25, wherein the first computer readable program code comprises first computer readable program code to receive sub-file data over the network, said sub-file data to include a Universal Resource Locator (URL) for each of said plurality of sub-files.

32. The computer program product of claim 25, wherein the second computer readable program code comprises second computer readable program code to issue the request, using said sub-file data, for the first sub-file from a first server and the second sub-file from a second server.

33. The computer program product of claim 25, wherein the third computer readable program code comprises third computer readable program code to receive over the network, in response to said request, said first sub-file from a network server, and to receive over the network, in response to said request, said second sub-file from said network server.

34. The computer program product of claim 25, wherein the third computer readable program code comprises third computer readable program code to receive over the network, in response to said request, said first sub-file from a first server and said second sub-file from a second server.

35. The computer program product of claim 25, wherein the fourth computer readable program code comprises fourth computer readable program code to combine said first sub-file and second sub-file into a reassembled file using the sub-file data.

36. The computer program product of claim 35, further comprising fifth computer readable program code to present said reassembled file using a media player executing on the client system.

* * * * *